(12) United States Patent
Bedell et al.

(10) Patent No.: US 10,574,354 B2
(45) Date of Patent: Feb. 25, 2020

(54) DATA TRANSFER ARRANGEMENT FOR A HYBRID INTEGRATED CIRCUIT (HIC) AND AN HIC WITH THE DATA TRANSFER ARRANGEMENT

(71) Applicant: International Business Machines Corporation, Armonk, NY (US)

(72) Inventors: Stephen W. Bedell, Wappingers Falls, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/839,824

(22) Filed: Dec. 12, 2017

(65) Prior Publication Data

US 2019/0181951 A1    Jun. 13, 2019

(51) Int. Cl.
*G06F 13/38* (2006.01)
*H04B 10/114* (2013.01)
*G06F 13/42* (2006.01)

(52) U.S. Cl.
CPC ....... *H04B 10/1141* (2013.01); *G06F 13/387* (2013.01); *G06F 13/423* (2013.01)

(58) Field of Classification Search
CPC combination set(s) only.
See application file for complete search history.

(56) References Cited

U.S. PATENT DOCUMENTS

| | | | |
|---|---|---|---|
| 6,423,001 B1 | 7/2002 | Abreu | |
| 7,518,149 B2 * | 4/2009 | Maaskant | H01L 31/035281 257/79 |
| 8,608,310 B2 | 12/2013 | Otis et al. | |
| 2016/0066789 A1 | 3/2016 | Rogers et al. | |
| 2016/0327737 A1 * | 11/2016 | Zhang | H01L 31/125 |

* cited by examiner

*Primary Examiner* — Raymond N Phan
(74) *Attorney, Agent, or Firm* — Law Office of Charles W. Peterson, Jr.; Louis J. Percello, Esq.; Erik K. Johnson, Esq.

(57) ABSTRACT

A hybrid integrated circuit (HIC) with a high bandwidth, low-power, miniaturized, optically coupled data communication interface, the interface and an arrangement including the HIC. Active and passive components and integrated circuit (IC) chips may be mounted on an HIC substrate and collecting data. The HIC is smaller than one millimeter square and communicates data externally through a microLED (μLED) array mounted on the HIC substrate and coupled to other HIC components. Each "on" μLED consumes less than ten microwatts (10 μW).

23 Claims, 1 Drawing Sheet

DATA TRANSFER ARRANGEMENT FOR A HYBRID INTEGRATED CIRCUIT (HIC) AND AN HIC WITH THE DATA TRANSFER ARRANGEMENT

BACKGROUND

Field of the Invention

The present invention is related to a miniaturized data interface and particularly to a miniaturized, optically coupled data interface for collecting data from hybrid integrated circuits (HICs).

Background Description

Electronic miniaturization has evolved from transistor and circuit level scaling to component and packaging miniaturization. A hybrid integrated circuit (HIC), hybrid microcircuit, or simply hybrid is one such miniaturized circuit. A typical HIC may include active and passive components, as well, one or more integrated circuit (IC) chips, all bonded to a substrate or printed circuit board (PCB). These multi-component, self-contained are low-cost and extremely miniaturized computer platforms, expected to become ubiquitous, e.g., with inclusion on clothing, as wearables, and for medical monitoring and environmental use.

The primary challenges in maintaining the miniature HIC form factor include powering the devices and collecting raw or processed data from the HICs. Thus, HIC manufacturers are turning to, for example, micro-batteries, RF coupling and photodiodes, for power. As yet, however, state of the art data transfer approaches have been too large for these extremely miniaturized systems.

Thus, there is a need for a miniaturized data interface and more particularly for a miniaturized data interface that does not require appreciable HIC real estate and thus does not expand HIC size beyond that of other typical HIC mounted devices.

SUMMARY

A feature of the invention is miniaturized, optically coupled data communications interface for hybrid integrated circuits (HICs);

Another feature of the invention is a high bandwidth, low-power data communication interface for collecting data from sub-millimeter devices, sensors or HICs;

Yet another feature of the invention is a high bandwidth, low-power, miniaturized, optically coupled data communication interface for collecting data from sub-millimeter devices, sensors or HICs.

The present invention relates to a hybrid integrated circuit (HIC) with a high bandwidth, low-power, miniaturized, optically coupled data communication interface, the interface and an arrangement including the HIC. Active and passive components and integrated circuit (IC) chips may be mounted on an HIC substrate and collecting data. The HIC is smaller than one millimeter square and communicates data externally through a microLED (µLED) array mounted on the HIC substrate and coupled to other HIC components. The µLED array consumes less than two hundred milliwatts (200 mW).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

Figure 1:
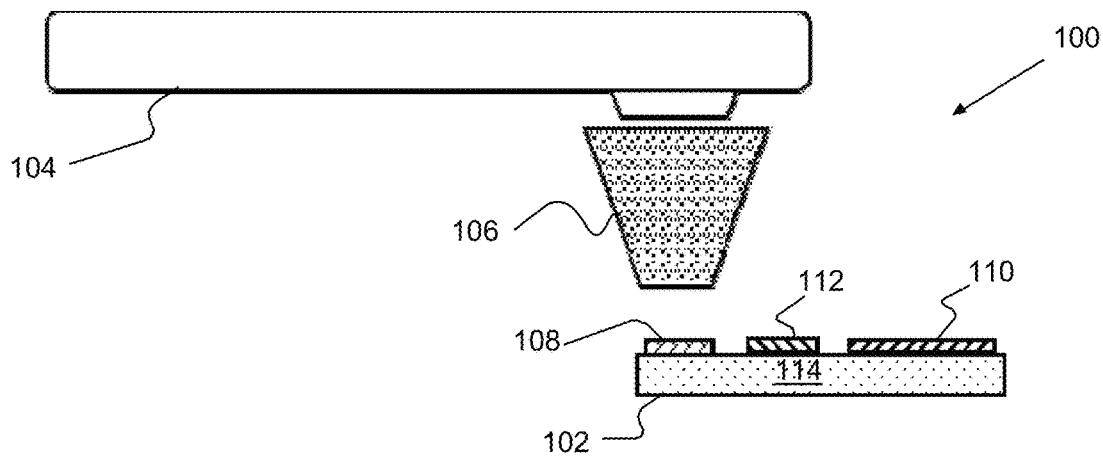
FIG. 1 shows an example of a receiver-hybrid integrated circuit (HIC) arrangement communicating over a preferred high-bandwidth optical communication link.

FIG. 1 shows an example of a receiver-hybrid integrated circuit (HIC) arrangement 100 communicating over a preferred high-bandwidth optical communication link according to a preferred embodiment of the present invention. The HIC 102 passes data optically to the receiver 104 through a lens or lens arrangement 106.

Preferably, the HIC 102 is smaller than one millimeter (1 mm) square, and includes one or more preferred light emitting diode (LED) source arrays 108, and may include individual active and passive devices and other components 110, 112 mounted on a HIC substrate 114. The HIC substrate 114 may be a semiconductor substrate, a printed circuit board (PCB) or a Printed Wiring Board (PWB). The preferred LED array(s) 108 provide a low-power optical data link. Active devices may include, for example, discrete transistors and diodes. Passive devices may include, for example, resistors, inductors, transformers and capacitors. Other mounted components 102 may also include a processor 110, an HIC supply 112 and other support chips (not shown), e.g., an optical receiver and a local storage capacity.

Figure 2:
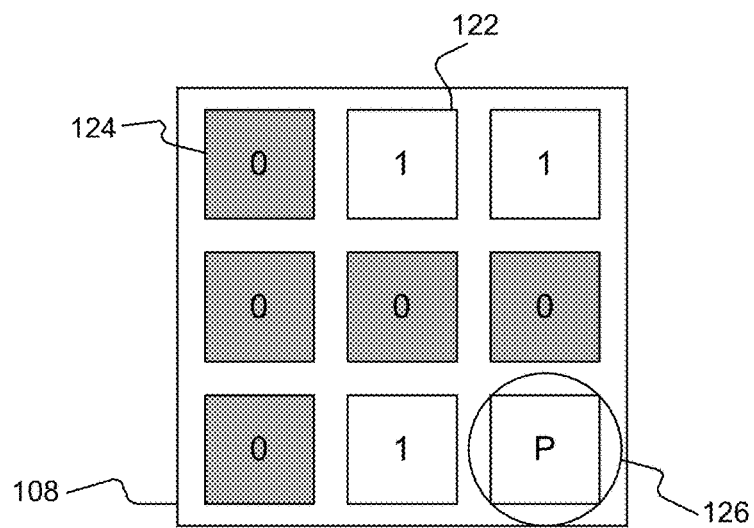
FIG. 2 shows an example of a preferred single parity protected byte LED array of microLEDs (µLEDs).

FIG. 2 shows an example of a preferred LED array 108 of microLEDs (µLEDs), a single parity protected byte (8 bits plus parity) on this example. An "on" or radiating µLED 120 may represent a logical one ("1") and an off or non-radiating µLED 122 may represent a logical zero ("0") with this example indicating 0110 0001 and even parity 124. Preferably, the µLED array 108 is a single fifty micrometer or micron (50 µm) by 50 µm microchip (µchip). Alternately, a semiconductor substrate 114 may have the µLEDs 120, 122, 124 formed directly on the substrate 114 surface, or individual µLEDs 120, 122, 124 may be mounted directly on the HIC substrate 114. Preferably, the array 108 is an n by m array of µLEDs 120, 122, 124, a 3 by 3 array in this example, with a common anode or cathode with n*m cathodes or anodes.

Each preferred µLED 120, 122, 124 may be a gallium nitride (GaN), gallium arsenide (GaAs), or indium phosphide (InP) µLED or combinations thereof. The preferred µLEDs 120, 122, 124 are twenty micrometers or microns (20 µm) square and thinner than 100 µm, preferably thinner than 50 µm. The level of detectable illumination depends on the receiver sensitivity.

In the current state of the art, a 10 µm square (100 µm$^2$) µLED at 250 nA provides detectable illumination for a close proximity photodiode, the preferred receiver 104. In particular for a preferred close proximity photodiode receiver 104, optically detectable emission for a typical GaN-based blue µLED (450 nm emission) has been shown to occur at about 2.4 nanoamperes per square micron of µLED area (2.4 nA/µm$^2$). State of the art GaN µLEDs emit detectable light at about 2.5 Volts, approximately 0.63 microwatts (0.63 µW).

So for this 3×3 or 9 LED array 108 example, all µLEDs 120, 122, 124 "on" simultaneously (worst case instantaneous power consumption) requires approximately 50 µW. A typical HIC 102 has an expected power requirement one milliwatt (1 mW). Thus, the preferred optical LED array 102 consumes less than 5% of total HIC power. Accordingly, a data transfer through the preferred micro-optical channel consumes less than 10% of total HIC power.

It should be noted that a single parity protected byte wide LED array 108 is described herein for example only. For higher data transfer rates, the LED array 108 may be multiple bytes wide or multiple LED array 108 may be included. To simplify identifying grid orientation, one or more μLED 120, 122, 124 (e.g., parity μLED 124) may be a different color than the other μLEDs 120, 122. Also, for better reliability, more extensive error correction may be used. Optionally, one or more individual μLED 120, 122, 124 may include a μlens 126 at its upper surface to increase external quantum efficiency (EQE), further reducing LED array 108 power requirements.

The combination of a preferred close proximity photodiode receiver 104 and lensing 106 may be used to collect a large fraction of the emitted light from each of the μLEDs 120, 122, 124 in a preferred LED array 108. Alternately, the receiver 104 may be a standalone charge coupled device (CCD) detector, an electronic camera or smartphone, e.g., of sub-millimeter electrical components. A CCD detector or CMOS based camera has reduced optical sensitivity and requires about an order of magnitude more power. i.e., an "on" μLED 120, 122, 124 requires ~6 μW detectable illumination.

For data transfer control the receiver 104 can strobe an LED (e.g., a smartphone camera flash) to an optical receiver (not shown) on the HIC 102, to effect an optical semaphore between the HIC 102 and the receiver 104. Thus, the receiver 104 can send/receive handshake commands to/from the HIC 102, e.g., parity fail, resend, ready, ack and other timing signals.

The lens 106 may be a single lens of a collection of lenses arranged for an expected or intended focal point. Optionally, for improved signal to noise ration (SNR) a notch filter may be included in the lens arrangement 106 or between the LED array 108 and lens 106.

Advantageously, the preferred μLED arrays provide a low-power optical data link for optically transferring multiple data bits in parallel from submillimeter electronic assemblies. Further, preferred μLED arrays consume very little power for microscopic light sources transmitting data the in the link.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A hybrid integrated circuit (HIC) comprising:
   an HIC substrate;
   one or more components mounted on said HIC substrate; and
   a microLED (μLED) array mounted on said HIC substrate, wherein said μLED array comprises a plurality of μLEDs arranged in an n by m array, said one or more components coupled to said μLED array through said HIC substrate and communicating data off said HIC through said μLED array.

2. A HIC as in claim 1, wherein said HIC substrate is smaller than one millimeter square.

3. A HIC as in claim 1, wherein said one or more components comprise active and passive components and one or more integrated circuit (IC) chips, data collected by said one or more being communicated externally through said μLED array.

4. A HIC as in claim 1, wherein the plurality of μLEDs are formed of a material selected from the group comprising gallium nitride (GaN), gallium arsenide (GaAs), indium phosphide (InP) or a combination thereof.

5. A HIC as in claim 1, wherein each μLED is less than one hundred microns (100 μm) thick.

6. A HIC as in claim 1, wherein each μLED is 10 μm square (100 μm).

7. A HIC as in claim 1, wherein each "on" μLED in said μLED array consumes less than ten microwatts (10 μW).

8. A HIC as in claim 5, wherein each μLED is less than 50 μm thick.

9. A HIC as in claim 7, wherein each "on" μLED in said μLED array consumes less than 1 μW.

10. A data transfer arrangement comprising:
    an optical receiver;
    an optical lens; and
    a hybrid integrated circuit (HIC) comprising:
      an HIC substrate,
      one or more components mounted on said HIC substrate, and
      a microLED (μLED) array including a plurality of μLEDs, said μLED array being mounted on said HIC substrate, said one or more components coupled to said μLED array through said HIC substrate and communicating data off said HIC through said μLED array, said optical lens being disposed between said HIC substrate and said μLED array, data being optically transferred from said μLED array through said optical lens to said optical receiver.

11. A data transfer arrangement as in claim 10, wherein said HIC substrate is smaller than one millimeter square, and said one or more components comprise active and passive components and one or more integrated circuit (IC) chips, data collected by said one or more being communicated externally through said μLED array.

12. A data transfer arrangement as in claim 10, wherein said μLEDs array comprises said plurality of μLEDs arranged in an n by m array, and wherein the plurality of μLEDs are formed of a material selected from the group comprising gallium nitride (GaN), gallium arsenide (GaAs), indium phosphide (InP) or a combination thereof.

13. A data transfer arrangement as in claim 10, wherein each μLED is less than one hundred microns (100 μm) thick.

14. A data transfer arrangement as in claim 10, wherein each μLED is 10 μm square (100 μm$^2$).

15. A data transfer arrangement as in claim 10, wherein each "on" μLED in said μLED array consumes less than ten microwatts (10 μW).

16. A data transfer arrangement as in claim 10, wherein said lens is a lens arrangement.

17. A data transfer arrangement as in claim 10, wherein said μLEDs array further comprises a microlens (Wens) on each of said plurality of μLEDs.

18. A data transfer arrangement as in claim 13, wherein each μLED is less than 50 μm thick.

19. A data transfer arrangement as in claim 15, wherein each "on" μLED in said μLED array consumes less than 1 μW, and said optical receiver is a photodiode.

20. A hybrid integrated circuit (HIC) comprising:
    an HIC substrate, wherein said HIC substrate is smaller than one millimeter square;
    one or more components mounted on said HIC substrate; and a microLED (μLED) array mounted on said HIC substrate, said one or more components coupled to said μLED array through said HIC substrate and communicating data off said HIC through said μLED array.

21. A hybrid integrated circuit (HIC) comprising:
an HIC substrate;
one or more components mounted on said HIC substrate, wherein said one or more components comprise active and passive components and one or more integrated circuit (IC) chips; and
a microLED (μLED) array mounted on said HIC substrate, said one or more components coupled to said μLED array through said HIC substrate and communicating data off said HIC through said μLED array and data collected by said one or more being communicated externally through said μLED array.

22. A hybrid integrated circuit (HIC) comprising:
an HIC substrate;
one or more components mounted on said HIC substrate; and
a microLED (μLED) array mounted on said HIC substrate, wherein each "on" μLED in said μLED array consumes less than ten microwatts (10 μW), said one or more components coupled to said μLED array through said HIC substrate and communicating data off said HIC through said μLED array.

23. A HIC as in claim 22, wherein each "on" μLED in said μLED array consumes less than 1 μW.

* * * * *